US012639962B2

(12) United States Patent (10) Patent No.: US 12,639,962 B2
Sukalski et al. (45) Date of Patent: May 26, 2026

(54) DISPENSING CABINET INCORPORATING VISION BASED COUNTING SYSTEMS AND METHODS

(71) Applicant: Illinois Tool Works Inc., Glenview, IL (US)

(72) Inventors: Andrew Sukalski, Fairmont, MN (US); Jacob Green, Fairmont, MN (US); Gregory Abel, Fairmont, MN (US); Eric Holland, Lake Crystal, MN (US); Cory Hainy, Fairmont, MN (US)

(73) Assignee: Illinois Tool Works Inc.

( * ) Notice: Subject to any disclaimer, the term of this patent is extended or adjusted under 35 U.S.C. 154(b) by 689 days.

(21) Appl. No.: 18/072,124

(22) Filed: Nov. 30, 2022

(65) Prior Publication Data

US 2023/0196800 A1 Jun. 22, 2023

Related U.S. Application Data

(60) Provisional application No. 63/290,190, filed on Dec. 16, 2021.

(51) Int. Cl.
| | |
|---|---|
| *G06K 9/00* | (2022.01) |
| *B65B 35/54* | (2006.01) |
| *G06V 10/141* | (2022.01) |
| *G06V 20/52* | (2022.01) |
| *G06V 20/60* | (2022.01) |

(52) U.S. Cl.
CPC ............. *G06V 20/60* (2022.01); *B65B 35/54* (2013.01); *G06V 10/141* (2022.01); *G06V 20/52* (2022.01)

(58) Field of Classification Search
None
See application file for complete search history.

(56) References Cited

U.S. PATENT DOCUMENTS

| | | | | |
|---|---|---|---|---|
| 5,522,512 A | * | 6/1996 | Archer | B65B 57/14 |
| | | | | 209/580 |
| 5,638,657 A | * | 6/1997 | Archer | B65B 5/103 |
| | | | | 53/244 |

(Continued)

FOREIGN PATENT DOCUMENTS

WO WO-2008031213 A1 * 3/2008 ......... G07F 11/1657

OTHER PUBLICATIONS

WO-2008031213-A1 (machine translation) (Year: 2008).*
Int'l Search Report and Written Opinion PCT/US2022/051798 mailed Apr. 24, 2023.

*Primary Examiner* — Feng Niu
(74) *Attorney, Agent, or Firm* — MCANDREWS HELD & MALLOY, LTD.

(57) ABSTRACT

Disclosed are systems and methods for a dispensing cabinet incorporating an image based counting system that includes one or more imaging devices (e.g., one or more color cameras) to capture images of one or more items (e.g., pills, capsules, pharmaceutical units, items for medical use, etc.). Control circuitry of the image based counting system is configured to determine one or more properties of the one or more items based on the images. The dispensing cabinet includes a cabinet housing comprising one or more containers to hold the one or more items, which may employ mounting hardware to releasably secure the image based counting system to the cabinet housing.

15 Claims, 7 Drawing Sheets

(56)                    References Cited

U.S. PATENT DOCUMENTS

| | | | |
|---|---|---|---|
| 6,707,381 B1 * | 3/2004 | Maloney | G07F 9/026 |
| | | | 340/568.1 |
| 7,317,393 B2 * | 1/2008 | Maloney | G07C 9/27 |
| | | | 340/568.1 |
| 8,457,384 B2 | 6/2013 | Smilansky | |
| 8,712,163 B1 | 4/2014 | Osheroff | |
| 8,925,762 B2 * | 1/2015 | Deppermann | B65G 11/088 |
| | | | 221/68 |
| 9,031,853 B2 | 5/2015 | Bartfeld | |
| 9,147,174 B2 * | 9/2015 | Glickman | H04N 7/18 |
| 9,238,518 B2 | 1/2016 | Luciano, Jr. | |
| 9,842,257 B2 | 12/2017 | Gershtein | |
| 9,886,554 B2 * | 2/2018 | Patel | A61J 7/0084 |
| 9,922,413 B2 * | 3/2018 | Glickman | G06V 10/56 |
| 9,956,145 B2 | 5/2018 | Thompson | |
| 10,360,751 B2 * | 7/2019 | Berg | G16H 70/20 |
| 10,892,048 B2 | 1/2021 | Reddy | |
| 12,038,390 B2 * | 7/2024 | Whittier | G06V 10/60 |
| 2004/0113786 A1 * | 6/2004 | Maloney | G07C 9/38 |
| | | | 340/568.1 |
| 2011/0132721 A1 * | 6/2011 | Kevin | G05B 15/02 |
| | | | 198/360 |
| 2015/0066204 A1 | 3/2015 | Patel | |
| 2015/0302255 A1 * | 10/2015 | Gershtein | G06T 3/60 |
| | | | 382/128 |
| 2016/0357937 A1 * | 12/2016 | Walter | G06Q 10/083 |
| 2017/0132867 A1 * | 5/2017 | Berg | A61J 7/0481 |
| 2021/0052468 A1 | 2/2021 | Whittier | |
| 2021/0161767 A1 | 6/2021 | Holmes | |
| 2021/0304122 A1 * | 9/2021 | Dattamajumdar | G16H 40/20 |

* cited by examiner

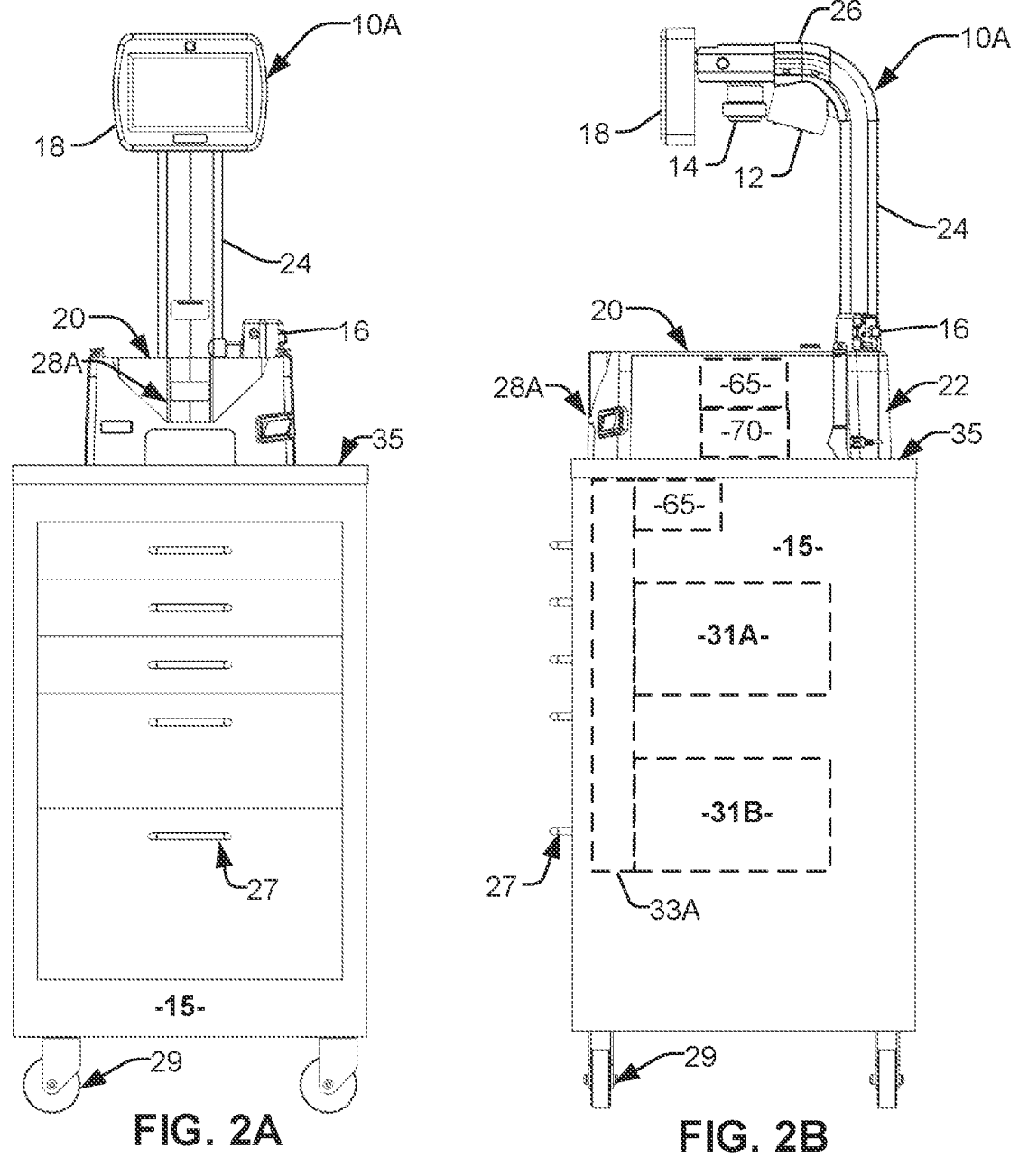
FIG. 2A                    FIG. 2B

DISPENSING CABINET INCORPORATING VISION BASED COUNTING SYSTEMS AND METHODS

RELATED APPLICATIONS

The present application claims the benefit of, and priority to, U.S. Provisional Application No. 63/290,190, filed Dec. 16, 2021, entitled "Dispensing Cabinet Incorporating Vision Based Counting Systems And Methods." The complete subject matter and contents of App. Ser. No. 63/290,190 are incorporated herein by reference in their entireties.

BACKGROUND

There are a variety of ways to process a pharmaceutical order, such as manually counting pills and/or employing weighing and counting scales. The conventional approaches can be slow and cumbersome, and provide limited additional information to an operator, which can cause count and process errors.

Tradeoffs in using known weight-based can include control of contamination, management of detected unit defects such as fragments of various sizes, and calibration requirements. While weight-based systems require periodic calibration to ensure accuracy, optical systems are substantially insensitive to drift characteristic of weight transducers. This may be offset by size and cost considerations, wherein pour through optical systems demand comparatively heavy use to justify the resource commitment involved.

Process errors are problematic when accounting for pharmaceutical items for inventory transactions. Such items must be specifically identified and counted in order to be properly inventoried. This process may also include storage in a secure container.

Accordingly, there is a need for a counting system for pharmacy and other applications that integrates a machine-vision-based unit into a secure container for controlled inventory management.

SUMMARY

The present disclosure relates generally to image based counting systems and methods. In particular, the image based counting systems are employed with and/or incorporated into a dispensing cabinet.

DRAWINGS

These and other features, aspects, and advantages of the present disclosure will become better understood when the following detailed description is read with reference to the accompanying drawings in which like characters represent like parts throughout the drawings, wherein:

FIGS. 2A-2D illustrate multiple views of another example image based counting system incorporated into a dispensing cabinet, in accordance with aspects of this disclosure.

The figures are not necessarily to scale. Where appropriate, similar or identical reference numbers are used to refer to similar or identical components.

DETAILED DESCRIPTION

Figure 1A:
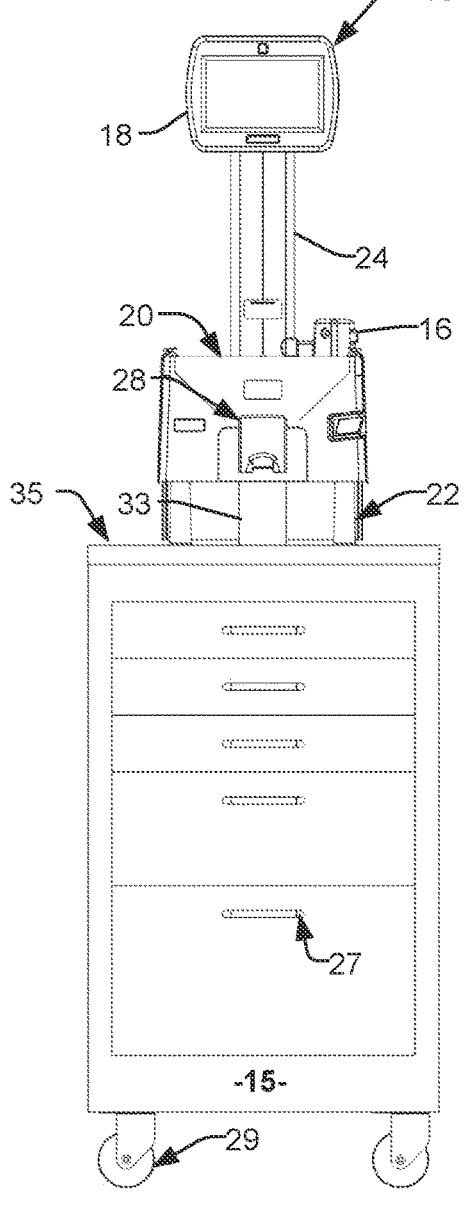
FIGS. 1A-1E illustrate multiple views of an example image based counting system incorporated into a dispensing cabinet, in accordance with aspects of this disclosure.

The present disclosure is directed to image based counting systems and methods generally. In some examples, a dispensing cabinet incorporating an image based counting system includes one or more imaging devices (e.g., one or more color cameras) to capture images of one or more items (e.g., pills, capsules, pharmaceutical units, items for medical use, etc.). Control circuitry of the image based counting system is configured to determine one or more properties of the one or more items based on the images. The dispensing cabinet includes a cabinet housing comprising one or more containers to hold the one or more items, employing mounting hardware to releasably secure the image based counting system to the cabinet housing.

In some examples, the image based counting systems and methods employ one or more illumination devices (e.g., one or more illumination sources to provide variable and/or dynamic lighting), which can be arranged above, about, and/or within the dispensing cabinet. In examples, the image based counting system provides illumination to a tray upon which one or more items are placed and/or sorted. The illuminated items are then imaged by the one or more imaging devices based on one or more imaging techniques or processes to determine and/or present information associated with one or more properties of the item. In some examples, the information is used to assess and determine one or more protocols for processing items. Based on determined processing protocols, the system is configured to control securing the items.

The disclosed dispensing cabinet incorporating an image based counting system is configured to receive items to be inventoried and secure, image, count, and/or identify the type of item. Once identified, the item can be checked for processing protocols, such as level of security required for storage of the item, as well as generate a record of the item. Further, the system is configured to automatically channel the items from a counting/sorting tray into the cabinet, which may house one or more storage containers.

In disclosed examples, a dispensing cabinet incorporating an image based counting system is provided. The image based counting system includes one or more imaging devices to capture images of one or more items, and control circuitry configured to determine one or more properties of the one or more items based on the images. A cabinet housing comprising one or more containers to hold the one or more items, and mounting hardware to releasably secure the image based counting system to the cabinet housing.

In some examples, the image based counting system further comprises one or more funnels to channel the one or more items into one or more openings in the cabinet housing. In examples, the one or more funnels comprise one or more mechanical diverters configured to align the one or more funnels with a first opening of the one or more openings or a second opening of the one or more openings.

In examples, the control circuitry is further configured to control movement of the one or more mechanical diverters based on the determined one or more properties. In examples, the image based counting system further comprises an actuator to adjust a position or orientation of the one or more funnels to align with the first opening or the second opening. In examples, the mounting hardware is further configured to secure and orient the one or more funnels. In examples, the image based counting system further comprises one or more lighting sources configured to illuminate the platform or the one or more items, the one or more imaging devices configured to capture properties of the one or more items.

In some examples, the control circuitry is further configured to receive images of the illuminated one or more items from the one or more imaging devices, identify a property of the one or more items, compare the property to a list of properties corresponding to a plurality of processing protocols, and determine a processing protocol of the plurality of processing protocols for the one or more items based on the comparison. In examples, the one or more properties comprises a color, a shape, a size, a printed or marking, or an orientation of the one or more items.

In examples, the one or more items comprise one or more of a pill, a capsule, or a pharmaceutical unit.

In disclosed examples, a dispensing cabinet incorporates an image based counting system. The image based counting system includes one or more imaging devices to capture images of one or more items, and a control circuitry configured to determine one or more properties of the one or more items based on the images, and a cabinet housing comprising one or more containers to hold the one or more items, wherein the image based counting system is partially integrated within the cabinet housing, the image based counting system configured to extend from at least one surface of the cabinet housing.

In some examples, the image based counting system further comprises a platform to hold the one or more items, the platform exposed from the at least one surface of the cabinet housing. In examples, an actuator to adjust a position or orientation of the platform to cause the one or more items to be channeled into the one or more containers.

In examples, one or more lighting sources to illuminate the platform or the one or more items. In examples, the one or more imaging devices or the one or more lighting sources are arranged below the platform within the cabinet housing.

In some examples, the control circuitry is further configured to receive images of the platform and the one or more items from the one or more imaging devices, identify a property of the one or more items based on the images, compare the property to a list of properties that corresponds to a plurality of processing protocols, determine a processing protocol of the plurality of processing protocols for the one or more items based on the comparison, and control a position or orientation of the platform to divert the one or more items to a first container in response to a determination that the one or more items is subject to a first processing protocol, and divert the one or more items to a second container in response to a determination that the one or more items is subject to a second processing protocol.

In examples, the control circuitry comprises a network interface to communicate with a remote device configured to send and receive information. In examples, the remote device comprises a user interface to display an image of the property of the one or more items.

In examples, one or more of the imagining system, the control circuitry, the actuator or the lighting sources are incorporated within the cabinet.

In examples, the one or more lighting sources are arranged below the platform and configured to illuminate the platform or the object from below the platform Turning now to the drawings, FIGS. 1A-1E illustrate an example image based counting system 10 mounted to a dispensing cabinet 15, in accordance with aspects of this disclosure. As shown, the image based counting system 10 is arranged on a surface 35 of the cabinet 15. As shown, one or more legs 22 (e.g., posts, mounts, blocks, pegs, etc.) support the system 10, which can be mounted to a system frame 21. The cabinet 15 may be in a fixed location, and/or may be movable via one or more casters 29.

As shown, the system 10 may be releasably or removably mounted to the cabinet 15, such as by one or more fasteners, mounts, or mounting hardware 25. In some examples, complementary portions of the mounting hardware 25 are arranged on the surface 35 and/or the legs 22, such that the system 10 can be readily mounted on and/or removed from the cabinet 15.

Figure 1B:
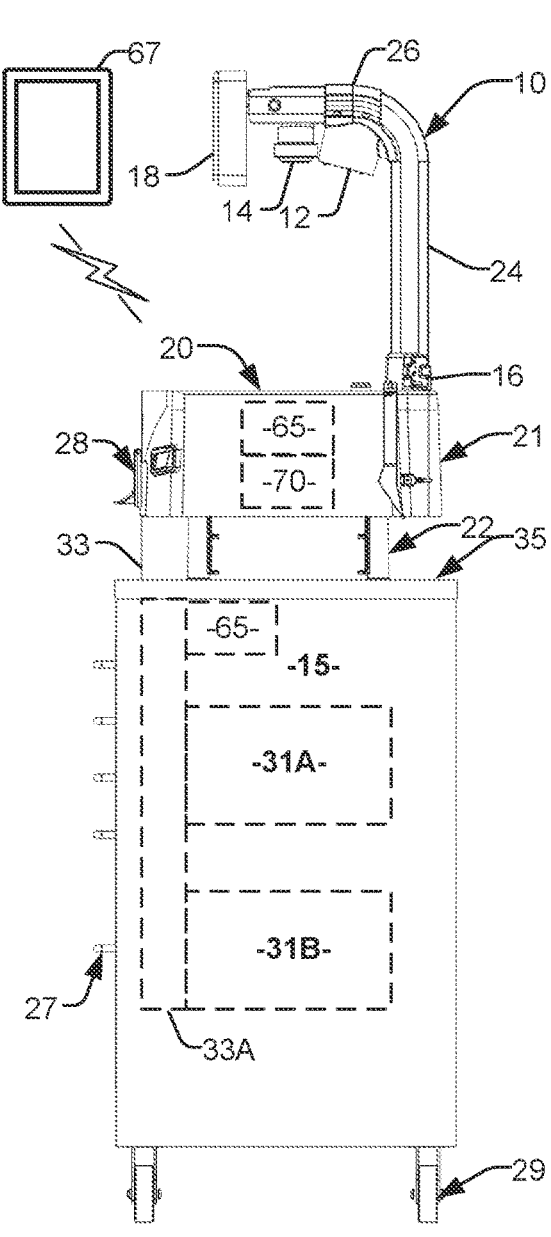
Figure 1C:
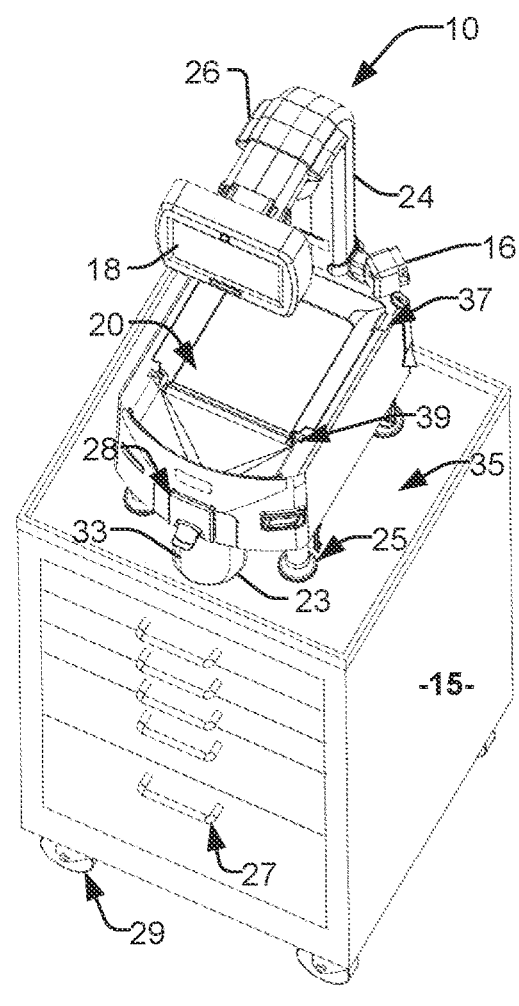
Figure 1D:
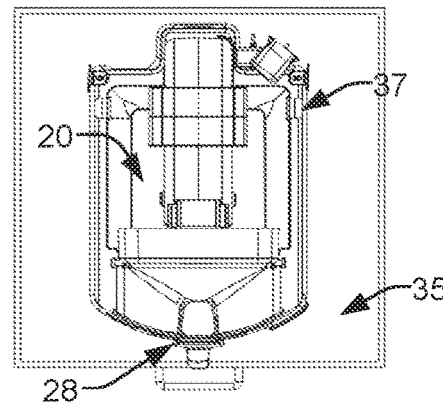
Figure 1E:
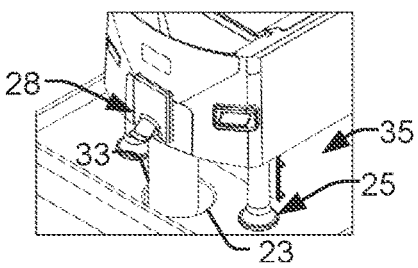
Figure 2C:
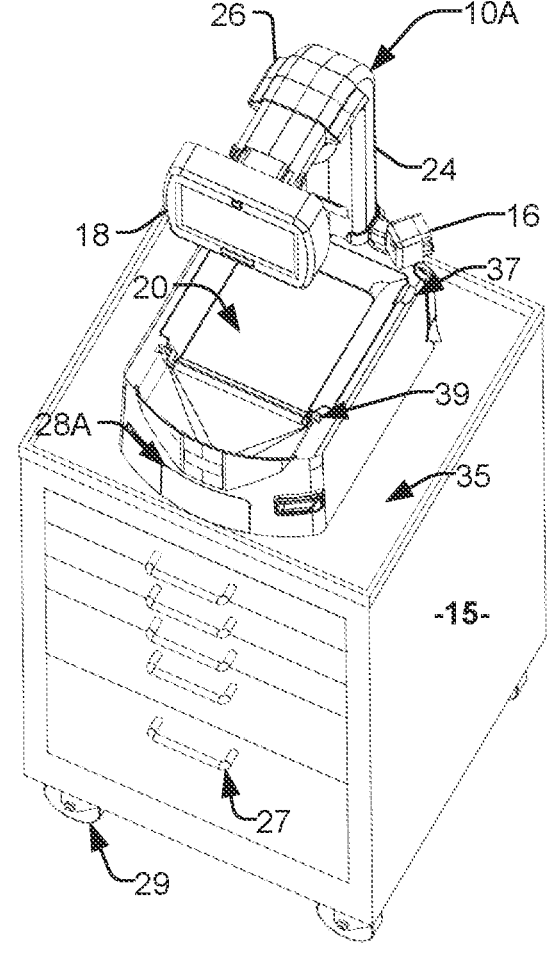
Figure 2D:
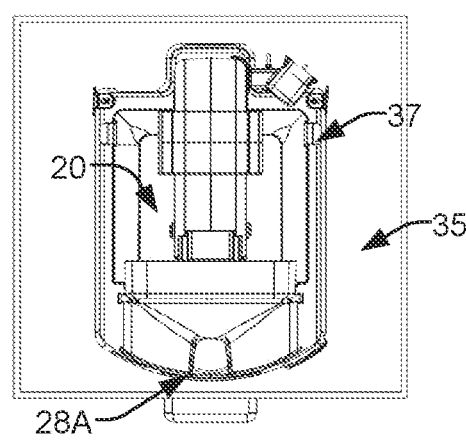
Figures 3A, 3B:
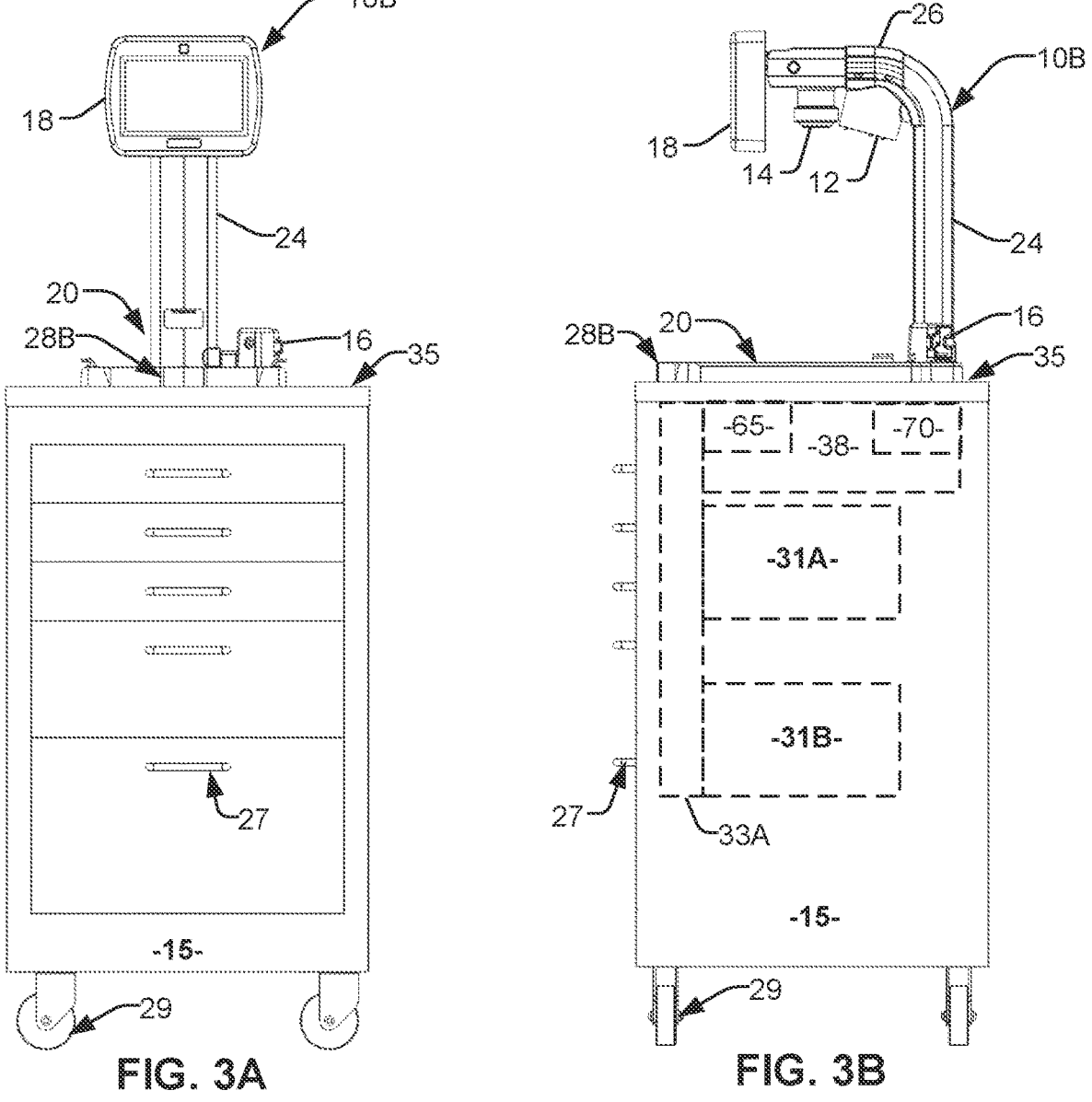
FIGS. 3A-3D illustrate multiple views of yet another example image based counting system incorporated into a dispensing cabinet, in accordance with aspects of this disclosure.
Figure 3C:
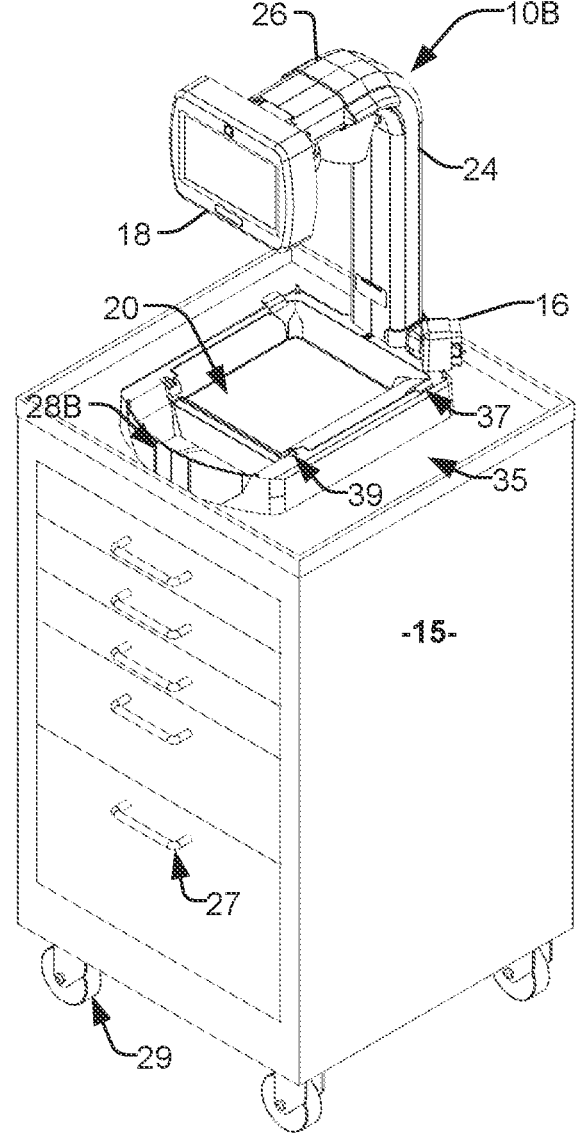
Figure 3D:
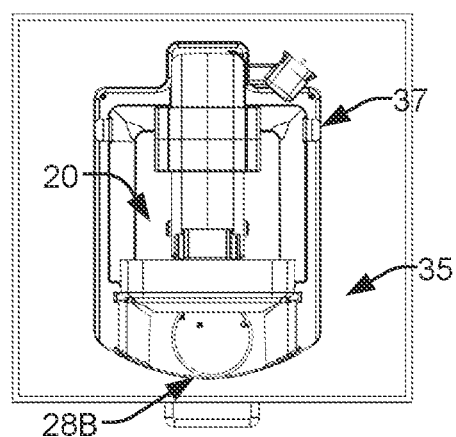

Having arranged the system 10 onto the cabinet 15, one or more openings or holes 23 in the surface 35 are configured to receive one or more tubes 33 to channel items from the system 10 into the cabinet 15. For example, the system 10 may include a tray 20 for placing one or more items for imaging. The tray 20 can empty into a dispensing funnel 28, which can direct items trough the tube 33 and into the cabinet 15. In particular, the tube 33 can connect with one or more tubes 33A within the cabinet 15, the tubes 33A configured to channel items into one or more storage containers 31A or 31B, as shown in FIG. 1B. In examples, the storage containers are accessible via one or more drawers 27, which may be secured by a variety of methods (e.g., lock and key, electromagnetic closure, etc.).

In some examples, one or more of the dispensing funnel 28, the tube 33, and/or the tube 33A is configured to move to channel the items into one or the other of containers 31A, 31B. In some examples, the surface 35 may have two holes 23 each leading to a tube 33A connected to a single storage container. The dispensing funnel 28 can include a mechanical diverter, which is configured to be moved (e.g., manually or automatically) to channel the items into one or the other tubes 33A according to a desired storage container. The dispensing funnel 28 may also move to dispense items away from the system 10 and/or the cabinet 15 (e.g., a pill bottle, package, etc.).

In some examples, the tray 20 may pivot about line 39, allowing items contained in the tray 20 to fall into the dispensing funnel 28 and into the cabinet 15. In some examples, the tray 20 is lifted manually via tab 37. In some examples, the tray 20 is moved automatically via one or more actuators, such as in response to an identification of the items from the system 10.

As shown in FIGS. 1A-1E, one or more imaging systems 12, 14 are mounted to arm 24 via one or more attachments 26. The imaging systems 12, 14 can include an illumination device and/or a color camera, one or both of which can be angled to capture images of the tray 20, the dispensing funnel 28, and/or other areas within the vicinity of the system 10. Capturing and processing images can be employed to identify and/or prevent errors, such as cross-contamination of different items, to ensure the correct items are directed to the designated storage container 31A, 31B.

In some examples, a supplemental imaging device 16 can be provided, such as mounted to the frame 21, employed to capture information related to the order, such as vial label information. In some examples, supplemental imaging device 16 is removable for mounting on a different location on the frame 21, another location separate from the frame 21, and/or provided as a handheld or otherwise portable imaging device linked to the system 10 via one or more communication links (e.g., via wired and/or wireless data transfer channels and/or protocols via network interface 63 of FIG. 5). Additionally or alternatively, the supplemental imaging device 16 can be employed to capture images of an area outside the field of view of the imaging system 12 and the imaging device 14.

In disclosed examples, an inventory management process involves capturing images of the pills on the tray 20, containers filled with the pills, and images of the funnel 28. Each image can be captured by employing different lighting techniques to enhance one or more visual properties (e.g., embossed, etched, or embedded markings, imprints, colors, shapes, etc.) of the items being imaged. In some examples, the imaging device(s) have a fixed focus for imaging the items on the tray 20, and provide an autofocus feature for imaging a container and/or the items.

The system 10 is configured to scan the stock number of the container and/or pill, providing information to the operator (such as the National Drug Code (NDC)), which informs the system 10 of the color, size and shape of the pill, which the system 10 uses to adjust the lighting of the filled container. In some examples, information is displayed on user interface 18 or remote computing device 67 as images and/or text from one or more relevant databases (e.g., stored in memory, accessed from a list of information such as maintained by a governmental body, etc.). Presentation of this information aids in the operator comparing and/or validating the pills order with associated information from one or more databases (e.g., within the control circuitry 70 and/or via connected via a network).

Once a record of the processed order is created, data management can be updated based on the imaged items and the collected information. For instance, color photos can be used as evidence to assist in proper and efficient order processing or inventory management procedure, such as securing and containing the items. In some examples, the system 10 is connected to a network, which provides a link to a remote computing platform. Through this connection, a remote system or individual, such as the pharmaceutical manufacturer, can review and/or validate a transaction being performed in a distant location.

The captured images may then be compared against one or more reference images, and/or may be digitized or otherwise reformatted, to provide information to processing circuitry 66 to control a focus of the relevant image capture device.

The processor module 66 further interprets the images to generate a count of items, identify the type of item (e.g., by comparing images of the items to one or more databases stored on the control circuitry 70 and/or stored in a connected a network). Once identified, the control circuitry 70 determines-what level of security such items require, as well as which container is configured to provide the desired security level or serve as a holding container for the items.

The control circuitry 70 is further configured to control the funnel 28 to facilitate processing and storage. This can include controlling an actuator 65 (within the system 10 and/or the cabinet 15) to change a position or orientation of the funnel 28 to automatically channel the items from the tray 20 into a container 31A, 31B. In some examples, the control circuitry 70 can release an interlock, which would otherwise prevent movement of the funnel 28 (e.g., manual movement) toward a given tube 33. In some examples, instructions may be presented on display component 18 or transmitted to a connected remote computing device 67 (e.g., to transmit and/or receive instructions or data for a particular operation), which indicate the desired storage container and/or tube, for instance.

As disclosed herein, the image based counting system 10 and its imaging, identification, determination, and/or control capabilities are applicable to each described example, regardless of mounting arrangement on the cabinet 15. Thus, each capability described with respect to one image based counting system is equally applicable to any other image based counting system.

FIGS. 2A-2D illustrate multiple views of another example image based counting system incorporated into a dispensing cabinet, in accordance with aspects of this disclosure. In the example of FIGS. 2A-2D, a frame 21 of image based counting system 10A is mounted directly onto the surface 35. For example, there are no legs 22 supporting the system 10A and/or separating the system 10A from the surface 35. The legs 22 may be removed from a system similar to system 10, for instance. Mounting hardware may be provided on the surface 35 and/or the system 10 to secure the In some examples, the system 10A is configured to channel items from the tray 20 through a dispensing funnel. In some examples, the dispensing funnel is similar to funnel 28. In some examples, a modified dispensing funnel 28A is configured to channel the items into one or more holes 23 beneath the system 10A, and/or towards different tubes 33A (e.g., corresponding to different storage containers 31A, 31B).

FIGS. 3A-3D illustrate multiple views of yet another example image based counting system 10B incorporated into a dispensing cabinet 15, in accordance with aspects of this disclosure. In the example of FIGS. 3A-3D, a portion 38 of the system 10B is arranged within an interior of the cabinet 15. For instance, the surface 35 can be cut or otherwise modified to accept the portion 38 while leaving exposed the tray 20, all or a portion of the dispensing funnel 28A, and/or the imaging systems.

The functionality of system 10B is similar to systems 10, 10A, while having a substantially fixed arrangement within the cabinet 15. Thus, the dispensing funnel 28A may be configured to move (e.g., manually and/or automatically) to channel items from the tray 20 into the containers 31A, 31B.

Figures 4, 5:
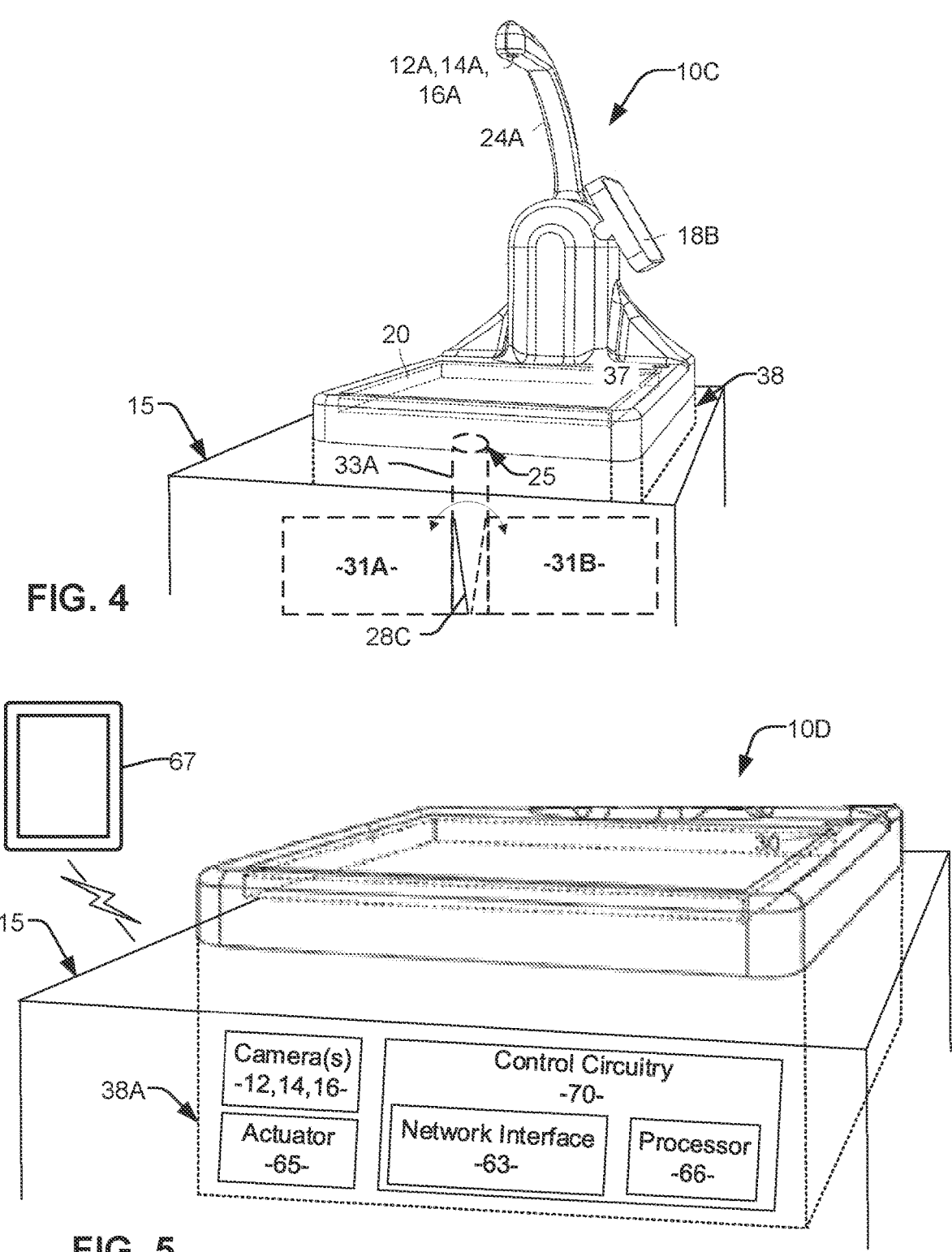
FIG. 4 illustrates yet another example image based counting system incorporated into a dispensing cabinet, in accordance with aspects of this disclosure.
FIG. 5 illustrates yet another example image based counting system incorporated into a dispensing cabinet, in accordance with aspects of this disclosure.

FIG. 4 illustrates another example image based counting system 10C integrated into dispensing cabinet 15. The mounting arrangement of system 10C is similar to that of system 10B, such that a portion of the system 10C is arranged within an interior of the cabinet 15. System 10C provides an alternative imaging system 12A, 14A, 16A, supported by arm 24A. A user interface 18B is attached to the system frame to communicate and control the system 10C, and may be removable and used remotely.

FIG. 4 provides an example dispensing system 28C comprising a mechanical diverter. As shown, dispensing system 28C is arranged at or in tube 33A between containers 31A, 31B. The dispensing system 28C can be controlled by control circuitry 70 to control an actuator (e.g., actuator 65) to adjust an orientation or position of the dispensing system 28C. For example, the mechanical diverter can pivot, thereby channeling items falling within the tube 33A into one or other of the containers 31A, 31B.

The control circuitry is configured to process images to determine a type and/or disposition of an item. In some examples, a cabinet may include multiple storage containers. A first container may accept and secure items that require a first level of accessibility (e.g., requiring heightened security, for a controlled pharmaceutical, such as an opioid), whereas a second container may accept and secure items that require a second level of accessibility (e.g., requiring moderate security, for an over-the-counter drug, such as aspirin).

FIG. 5 illustrates another example image based counting system 10D incorporated into dispensing cabinet 15. The mounting arrangement of system 10D is similar to that of systems 10B and 10C, such that a portion of the system 10D is arranged within an interior of the cabinet 15. As shown, a modified portion 38A includes the one or more cameras 12, 14, 16, actuator 65, control circuitry 70 (which includes one or more of a network interface 63 and/or a processor module 66), components that are arranged above the tray 20 in some examples. In this configuration, illumination and/or imaging is performed from underneath the tray 20, with or without the use of mirrors, which can be formed of a semi-transparent material.

Although not shown for simplicity, the system 10D includes a funnel connected to a tube for channeling items into one or more storage containers within the cabinet, as disclosed herein.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z) (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A system comprising:
a cabinet housing;
an image based counting system comprising:
one or more imaging devices to capture images of one or more items;
control circuitry configured to determine one or more properties of the one or more items based on the images; and
one or more funnels to channel the one or more items into two or more openings in the cabinet housing, wherein the one or more funnels comprise one or more mechanical diverters configured to selectively align the one or more funnels with a first opening of the two or more openings or a second opening of the two or more openings, the cabinet housing comprising one or more containers to hold the one or more items, wherein the control circuitry is further configured to control movement of the one or more mechanical diverters based on the determined one or more properties; and mounting hardware to releasably secure the image based counting system to the cabinet housing.

2. The system of claim 1, wherein the image based counting system further comprises an actuator to adjust a position or orientation of the one or more funnels to align with the first opening or the second opening.

3. The system of claim 1, wherein the mounting hardware is further configured to secure and orient the one or more funnels.

4. The system of claim 1, wherein the image based counting system further comprises one or more lighting sources configured to illuminate a platform to hold the one or more items, the one or more imaging devices configured to capture properties of the one or more items.

5. The system of claim 1, wherein the control circuitry is further configured to:
receive images of the one or more items from the one or more imaging devices;
identify a property of the one or more items;
compare the property to a list of properties corresponding to a plurality of processing protocols; and
determine a processing protocol of the plurality of processing protocols for the one or more items based on the comparison.

6. The system of claim 5, wherein the one or more properties comprises a color, a shape, a size, a marking, or an orientation of the one or more items.

7. The system of claim 1, wherein the one or more items comprise one or more of a pill, a capsule, or a pharmaceutical unit.

8. A system comprising:
an image based counting system comprising:
one or more imaging devices to capture images of one or more items;
a control circuitry configured to determine one or more properties of the one or more items based on the images;
a platform configured to hold the one or more items, the platform exposed from the at least one surface of the cabinet housing;
a cabinet housing comprising one or more containers to hold the one or more items, wherein the image based counting system is partially integrated within the cabinet housing, the image based counting system configured to extend from at least one surface of the cabinet housing;
one or more funnels to channel the one or more items into two or more openings in the cabinet housing, wherein the one or more funnels comprise one or more mechanical diverters configured to selectively align the one or more funnels with a first opening of the two or more openings or a second opening of the two or more openings, wherein the control circuitry is further configured to control movement of the one or more mechanical diverters based on the determined one or more properties; and
one or more lighting sources configured to illuminate the platform.

9. The system of claim 8, further comprising an actuator to adjust a position or orientation of the platform to cause the one or more items to be channeled into the one or more containers.

10. The system of claim 8, wherein the one or more imaging devices or the one or more lighting sources are arranged below the platform within the cabinet housing.

11. The system of claim 8, wherein the control circuitry is further configured to:

receive images of the platform and the one or more items from the one or more imaging devices;

identify a property of the one or more items based on the images;

compare the property to a list of properties that corresponds to a plurality of processing protocols;

determine a processing protocol of the plurality of processing protocols for the one or more items based on the comparison; and control a position or orientation of the platform to divert the one or more items to a first container in response to a determination that the one or more items is subject to a first processing protocol, and divert the one or more items to a second container in response to a determination that the one or more items is subject to a second processing protocol.

12. The system of claim 8, wherein the control circuitry comprises a network interface to communicate with a remote device configured to send and receive information.

13. The system of claim 8, wherein the remote device comprises a user interface to display an image of the one or more properties of the one or more items.

14. The system of claim 8, wherein one or more of the imagining system, the control circuitry, the actuator or the lighting sources are incorporated within the cabinet.

15. The system of claim 14, wherein the one or more lighting sources are arranged below the platform and configured to illuminate the platform or the one or more items from below the platform.

* * * * *